Dec. 21, 1943. E. DRONIGKE ET AL 2,337,233
DRIVE MECHANISM FOR OFFICE MACHINES
Filed Nov. 27, 1939 4 Sheets-Sheet 4
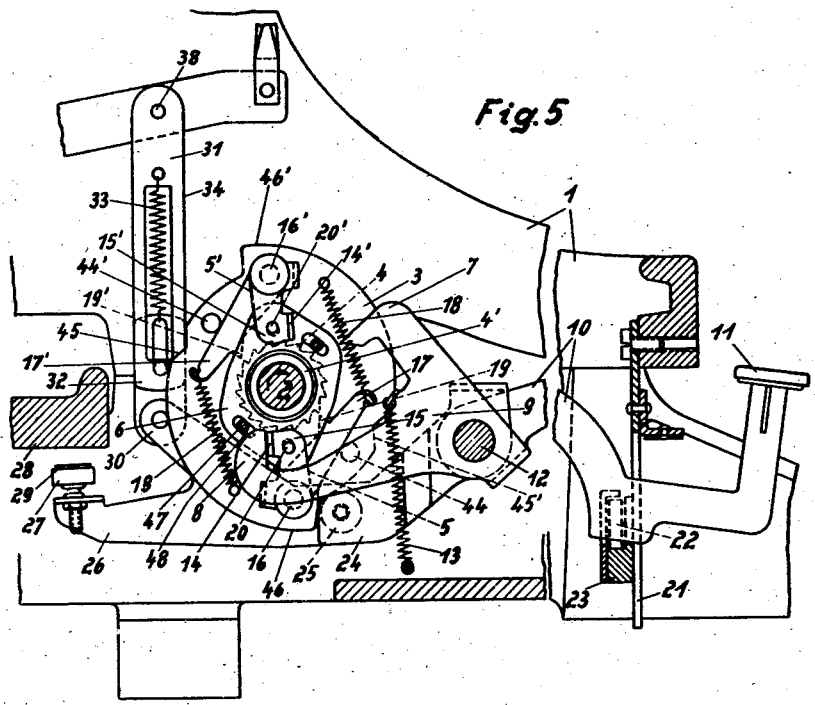
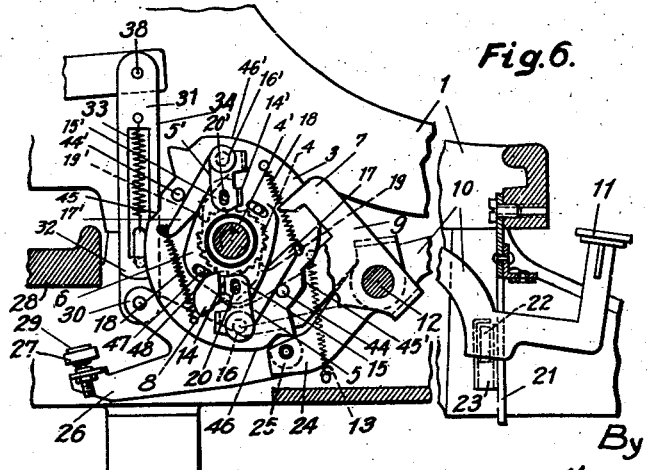
Inventors:
Erich Dronigke and
Hugo Schüler
By
Attorneys Patented Dec. 21, 1943

2,337,233

UNITED STATES PATENT OFFICE 2,337,233

DRIVE MECHANISM FOR OFFICE MACHINES

Erich Dronigke, Sommerda, and Hugo Schüler, Siegmar-Schonau, Germany; vested in the Alien Property Custodian Application November 27, 1939, Serial No. 306,390
In Germany December 1, 1938

10 Claims. (Cl. 197—17)

This invention relates to drive mechanism for office machines especially typewriters and calculating typewriters, of the kind in which the parts to be driven are actuated by cam discs which can be coupled by means of controllable connections with a rotary shaft for a limited rotational movement of the latter. Such drive mechanisms serve for the power actuation of driven parts, for example, type carriers, calculating means, shift devices, setting up means, control shafts, and other elements of such machines.

The object of the invention is to provide a reliable drive mechanism of the above kind which is simple, compact, cheap to manufacture, rapid and certain in operation, and of great durability. According to the present invention each cam disc is provided with a plurality of coupling connections which rotate with the disc and are subject to a common control.

A machine embodying the invention is illustrated in the accompanying drawings by way of example. In these drawings:

Fig. 5 is an elevational view of a drive unit in uncoupled position with the key held depressed;

Figure 6 is an elevational view, similar to Figure 5, of a drive unit having a cam disc provided with an extended cam.

Figure 1:
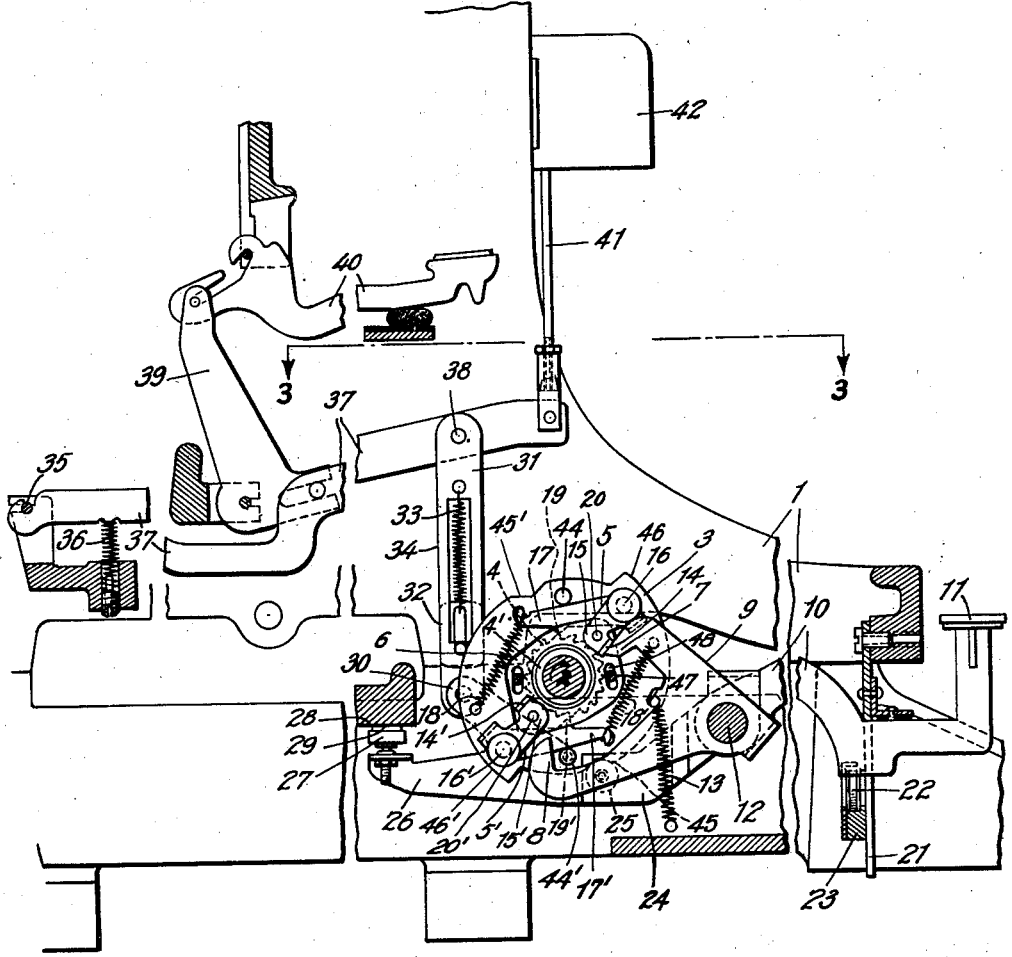
Figure 1 is an elevation partly in section of a typewriter having a drive unit of the mechanism according to the invention, the parts being shown in position of rest.

The machine illustrated comprises a frame 1 in which a shaft 2 is rotatably mounted, by means not shown, said shaft being driven from a source of power, also not shown, and being in constant rotation when the machine is in working condition. Each unit of the drive mechanism comprises a cam disc 3 loosely mounted on the shaft 2 and which can be coupled to a gear or ratchet wheel 4 fixed on the shaft 2. This coupling of the cam disc 3 is effected by a plurality, preferably two, coupling connections 5, 5' which are separately pivoted to the cam disc 3 and which are operatively connected by means of a common transmission member which in this instance is a plate 6 which can turn loosely on a hub 4' of the gear wheel 4, Fig. 1.

Figure 2:
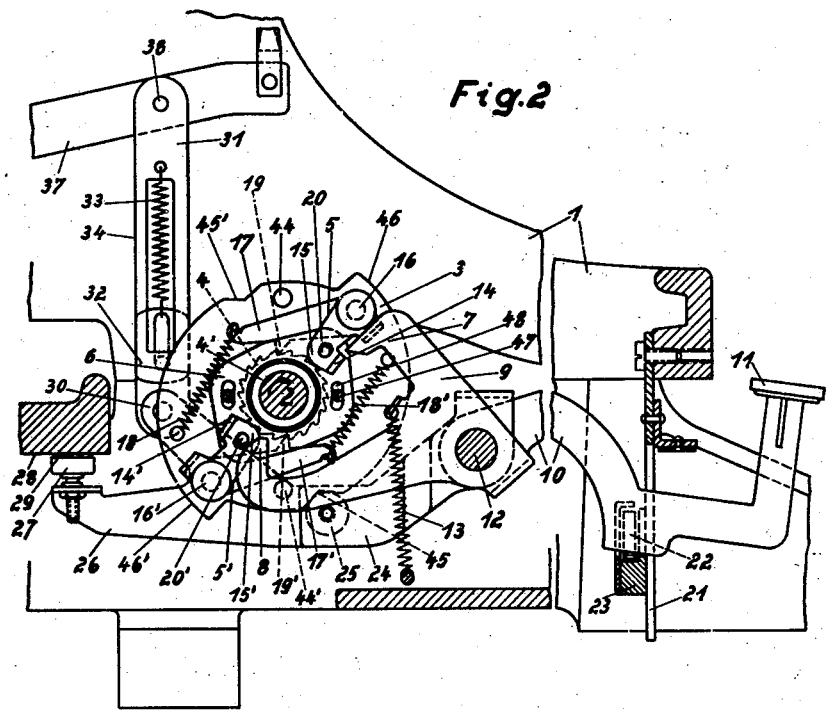
Fig. 2 is a similar view of a drive unit of the mechanism with a key depressed.
Figure 3:
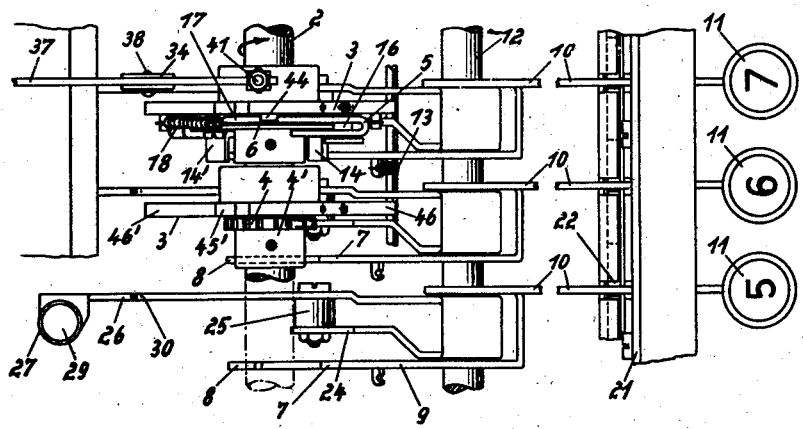
Fig. 3 is a plan view of a plurality of drive units, taken on the line 3—3 of Fig. 1, and in which some of the members of some of the drive units are omitted for sake of clearness.

The control for the engagement of the coupling connections 5, 5' is effected by means of a key lever 10 having a forked end serving as a control member 9 provided with control elements 7, 8. When the key lever 10 is rotated about its pivot 12 in clockwise direction, Fig. 1, against the action of a tension spring 13 attached to the control member 9, which action is effected by depressing a key 11, the control element 7 releases a contact lug 14 of a stop lever 15, which moves along with the coupling connection 5, Fig. 2. As a result of this release the coupling connection 5, under the action of a spring 18 attached to the shank portion 17 of the connection, is rocked in counter-clockwise direction, Fig. 2, about its pivot 16 on the cam disc 3, whereby a drive tooth 19 on the shank portion 17 engages the gear wheel 4. The stop lever 15 associated with the coupling connection 5 is guided in the plate 6 by means of a pin 20. A similar stop lever 15' moving with the coupling connection 5' is similarly guided in the plate 6 by means of a pin 20', so that the rocking of the coupling connection 5 is transmitted through the plate 6 to the coupling connection 5' whereby the latter is rocked in counter-clockwise direction, Fig. 2, about its pivot 16' on the cam disc 3. In this manner, with the aid of a tension spring 18' attached to the shank portion 17', a drive tooth 19' on said shank portion is also brought into engagement with the gear wheel 4. The plate 6 is provided with guide slots 48 cooperating with pins 47 on the cam disc 3.

A key lock arranged on a guide comb 21 for the key levers 7 and consisting of rollers 22 movable in a casing 23, prevents the simultaneous operation of more than one key, since the depressed key completely fills the gap between the rollers 22 which corresponds to the thickness of a key lever 10.

By means of this coupling of the cam disc 3 to the shaft 2 rotating in clockwise direction, the cam disc 3 is set in rotation. As a result a roller 25 rotatably mounted on the lever 24 and cooperating with cam contours 46, 46' of the cam disc 3 causes the lever 24 to rotate counter-clockwise about its pivot 12, from the position of Fig. 2 into the position of Fig. 4. The lever 24 is forked at its left-hand end and one fork arm 26 is provided with an adjustable stop member 27 cooperating with a stop member 28 arranged on the machine frame. The stop member 27 has a contact plate 29 of leather or other noise damping material. The other arm 30 of the forked left-hand end of the lever 24 is jointedly connected to a tension unit 34 composed of two links 31, 32, and a tension spring 33. The links 31, 32 are so connected to each other and with the tension spring 33 that they permit variation in length of the tension unit 34 due to the yielding of the spring 33.

The link 31 of the tension unit 34 is jointed by means of a pin 38 to a lever 37 which can rotate clockwise about a fixed pivot 35 against the action of a compression spring 36. This lever 37 in its movement actuates through the agency of a bell crank lever 39 a type lever 40, and also actuates through an adjustable link 41, a calculating mechanism 42. By these means a digit corresponding to that of the pressed key 11 is printed on the platen 43 and also the calculating mechanism 42 transmits the digital amount to a numeral wheel of an accumulator, not shown.

Figure 4:
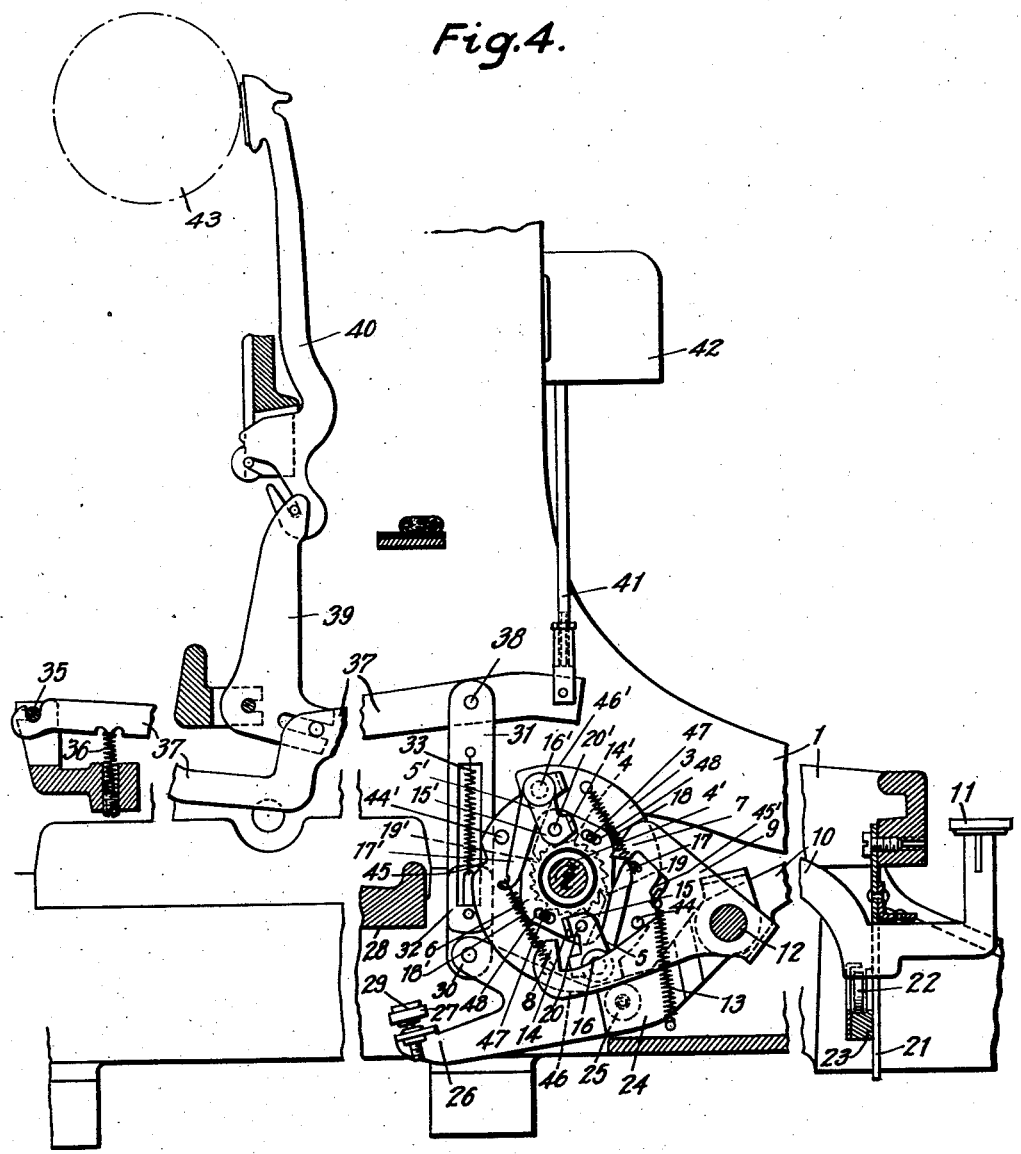
Fig. 4 is an elevational view of a drive unit showing the driven parts in operative position.

On further rotation of the cam disc 3 in clockwise direction out of the position shown in Fig. 4, the lever 24 turns backwardly about its pivot 12 in clockwise direction corresponding to the movement of its roller 25 upon the cam disc 3. The return movement of the lever 24 also brings the parts 34, 37, 39, 40, 41 driven thereby into their initial position, under the action of the compression spring 36 attached to the lever 37, Figs. 1 and 2.

The cam disc 3 remains coupled to the gear wheel 4 until one of the coupling connections, in the present case the connection 5', encounters with its contact lug 14' the control element 7 and is thereby rotated in clockwise direction about its pivot 16'. This movement is limited by a pin 44'. Consequently the drive tooth 19', and by the action of the plate 6 also the drive tooth 19, come out of engagement with the gear wheel 4 whereby the cam disc 3 comes to rest.

At the instant of disengagement of the coupling connections 5, 5' from the gear wheel 4, the roller 25 on the lever 24 is held by the spring 36 in one of the two notches 45, 45' provided in the cam disc 3, in the present case in the notch 45', so that the cam disc 3 is held in this position of rest.

Owing to the relatively high speed of rotation of the shaft 2 and of the cam disc 3, the roller 25 jumps from its outermost operative position, Fig. 4, right into the next notch 45'. Thereby the lever 24 is arrested by means of the adjustable contact member 27 on its fork arm 26 engaging the fixed stop 28, and the blow which would result from such a jump does not take place between the roller 25 and the notch 45', but between the contact member 27 with its leather shock absorbing plate 29 and the stop member 28 on the machine frame 1.

On actuating a key it will be seen that coupling between one of the cam discs 3 and the rotating shaft 2 is effected so that the cam disc 3 in question takes part in the rotation of the shaft 2. If the operated key is retained in depressed condition, Fig. 5, then the control element 8 of the control member 9 of the actuated key lever 10 remains in the path of the rotating contact lug 14 on the coupling connection 5. The lug 14 encounters in its path the control element 8 and effects a disengagement of the coupling connection 5 and also of the coupling connection 5' connected thereto through the plate 6. Consequently even when the key is held down disconnection of the cam disc 3 from the gear wheel 4 takes place. In this manner independently of the time taken to operate a key, only one operation of the drive mechanism takes place.

As soon as the depressed key is released the control element 8 rocks out of the path of movement of the contact lug 14 whereby under the action of the springs 18, 18' the coupling connections 5, 5' again establish driving connection between the cam disc 3 and the gear wheel 4. The cam disc 3 upon release of the key will therefore perform a short further rotation until the contact lug 14' engages the control element 7 and again effects uncoupling of the connections 5, 5', whereby the cam disc 3 finally comes to rest.

The mechanism may also be so constructed, for example by suitable formation of the cam disc 3, that in the position of Fig. 5 with the key held down, the roller 25 will stand just at the highest point of the cam curve 46 and will then remain in this position as long as the key is held down. This result can be obtained for example by suitably extending the cam curve 46 as illustrated in Figure 6. Return movement of the roller 25 and lever 24 and also the engagement of the roller 25 in the notch 45', would then take place only after release of the key. This modification is suitable for example in the case of shift mechanisms for instance for case shifting of the type segments, or platen shifts, in which instances the position of the driven member must be maintained for a definite interval, namely, the time of key depression.

In the example of an embodiment of the invention herein described and illustrated the cam disc 3 is shown with two cam curves and two coupling connections 5, 5' and each working operation extends through a half rotation of the shaft 2. Obviously the cam disc 3 may have more than two cam curves and more than two connecting members 5 without departing from the scope of the invention.

We claim as our invention:

1. Drive mechanism for office machines especially typewriters and calculating typewriters having machine parts to be actuated, comprising a rotary shaft, a cam disc rotatably mounted on said shaft, the cam surface of said cam disc being in driving connection with the machine parts to be actuated, a plurality of coupling connections between the cam disc and the rotary shaft for coupling and uncoupling said cam disc and said rotary shaft, said coupling connections being movably arranged on said cam disc, means operatively interconnecting said coupling connections for simultaneous movement into their respective coupling and uncoupling position, and common means for controlling the coupling and uncoupling actions of the coupling connections.

2. Drive mechanism according to claim 1, in which the common means for controlling the coupling and uncoupling action of the coupling connections include a single control member carrying control elements arranged in such a manner as to act upon the coupling connections, and in which a key lever is provided integral with the control member.

3. Drive mechanism according to claim 1, in which the cam disc is provided with a plurality of cam contours one for each coupling connection and a notch behind each cam contour, and in which a lever with a roller is provided to be actuated by means of said roller by the cam surfaces of the cam contours, said roller being adapted to engage one or another of the notches in the position of rest.

4. Drive mechanism according to claim 1, in which the cam disc is provided with a plurality of cam contours one for each coupling connection and a notch behind each cam contour, and in which a lever with a roller and an adjustable damping means are provided, said lever being actuated by means of said roller by the cam surfaces of the cam contours, said lever and said roller being limited in their movement by said adjustable damping means.

5. Drive mechanism for office machines especially typewriters and calculating typewriters having machine parts to be driven, comprising a rotary shaft, a cam disc rotatably mounted on said shaft, a lever with a roller actuated by the cam disc and being operatively connected with the machine parts to be driven, said cam disc being provided with notches, said roller engaging selectively with said notches in the position of rest, a plurality of coupling connections between the cam disc and the rotary shaft for coupling and uncoupling said cam disc and said rotary shaft, said coupling connections being movably arranged on said cam disc, means operatively connecting said coupling connections for simultaneous movement into their respective coupling and uncoupling position, and common means for controlling the coupling and uncoupling actions of the coupling connections.

6. Drive mechanism for office machines especially typewriters and calculating typewriters having machine parts to be actuated comprising a rotary shaft, a cam disc rotatable relatively to and coaxially with said shaft, the cam disc having at least one cam contour for coacting with the machine parts to be actuated, at least one coupling connection movably arranged on said cam disc to couple and uncouple the rotary shaft and the cam disc, at least two lugs movably arranged on said cam disc at opposite sides of its axis of rotation, means operatively connecting said lugs with each other and with the coupling connection, and a control member arranged on a fixed part of the machine and carrying two control elements, said control elements being alternately settable by operation of the control member into and out of operative position relative to said movable lugs to control the coupling and uncoupling action of the coupling connection.

7. Drive mechanism according to claim 6, in which a key lever is provided and in which the control member is formed integrally with the key lever.

8. Drive mechanism according to claim 6, in which the cam disc is provided with at least two cam contours and at least two notches, the number of notches corresponding to the number of cam contours, one notch being arranged behind each cam contour, and in which a lever with a roller is provided to be actuated by the cam disc, said roller being adapted to engage one or another of the notches in the position of rest.

9. Drive mechanism according to claim 6, in which a lever with a roller is provided to be actuated by the cam disc, and in which damping means are provided which are adjustably arranged for limiting the movement of the lever and the roller.

10. Drive mechanism for office machines especially typewriters and calculating typewriters having machine parts to be actuated, comprising a rotary shaft, a cam disc rotatable relatively to and coaxially with said shaft, the cam disc having at least two cam contours and at least two notches, the number of notches corresponding to the number of cam contours, one notch being arranged behind each cam contour, a lever with a roller actuated by the cam surface of the cam disc, said roller engaging selectively with said notches in the position of rest, means for actuating the parts of the machine operative by the lever and roller, at least one coupling connection movably arranged on said cam disc to couple and uncouple the rotary shaft and the cam disc, at least two lugs movably arranged on said cam disc at opposite sides of its axis of rotation, means operatively connecting said lugs with each other and with the coupling connection, and a control member arranged on a fixed part of the machine, and carrying two control elements, said control elements being alternately settable by operation of the control member into and out of operative position relative to said movable lugs to control the coupling and uncoupling action of the coupling connection.

ERICH DRONIGKE.
HUGO SCHÜLER.